(No Model.)
J. W. RICKER & T. S. LEWIS.
COLLAR FOR DOGS, &c.
No. 254,156.  Patented Feb. 28, 1882.
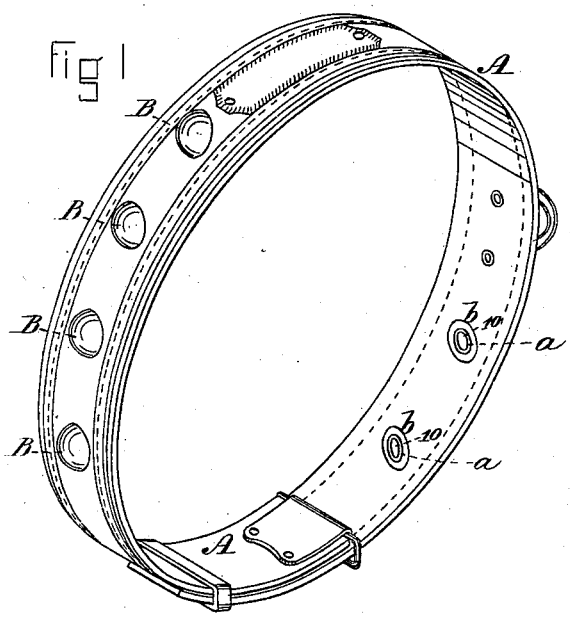
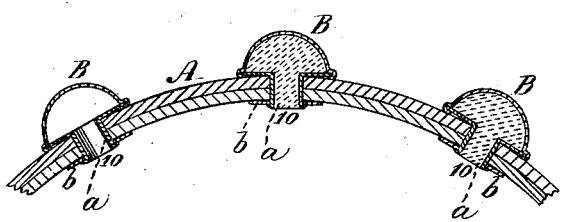
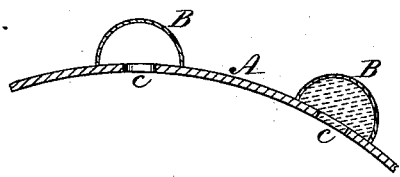
WITNESSES
INVENTORS

UNITED STATES PATENT OFFICE.

JOHN W. RICKER AND TRISTRAM S. LEWIS, OF CHELSEA, MASS.

COLLAR FOR DOGS, &c.

SPECIFICATION forming part of Letters Patent No. 254,156, dated February 28, 1882.

Application filed December 12, 1881. (No model.)

*To all whom it may concern:*

Be it known that we, JOHN W. RICKER and TRISTRAM S. LEWIS, citizens of the United States, residing at Chelsea, in the county of Suffolk and State of Massachusetts, have invented certain Improvements in Collars for Dogs and other Animals, of which the following is a full, clear, and exact description, reference being had to the accompanying drawings, making part of this specification, in which—

Figure 1 is a perspective view of a dog-collar having our improvements applied thereto. Fig. 2 is an enlarged vertical section through a portion of the same. Fig. 3 is a section representing a modification of our invention.

Our invention has for its object to provide for dogs and other animals a collar adapted to contain an insect or vermin exterminating substance or compound, which is free to escape through a suitable aperture or apertures onto the animal, and thus destroy or drive off any insects or vermin thereon; and our invention consists in a collar having one or more chambers or receptacles adapted to contain an insect or vermin exterminating substance, each receptacle being provided with an outlet or eduction passage to allow of the escape of the exterminating substance contained therein, as will now be particularly described.

In the said drawings, A represents a dog-collar composed of leather, metal, or other suitable material. Upon the outer surface of this collar are secured one or more metallic receptacles, B, struck up in the form of a hollow rivet, and provided with a tubular shank, *a*, which passes through an aperture in the collar, and is secured firmly in place by turning over or riveting its edge upon a washer, *b*, bearing against the inner surface of the collar, the end 10 of the shank being left open to afford communication with the interior of the receptacle B, which forms a chamber for containing an insect or vermin exterminating substance or compound, which, when the collar is upon the animal, is thus free to escape through the open end or outlet 10 of the conducting-shank *a*, and serves to destroy or drive off any insects or vermin—such as fleas, lice, &c.—the influence or effect of the exterminating compound being such that when applied to the neck of the animal by means of the collar above described it will effectually drive off vermin from all portions of the body. The receptacles B will contain a sufficient quantity of the exterminating substance to last for a considerable length of time, and when exhausted the supply can be easily renewed by taking off the collar and introducing it into the chambers through the hollow shanks *a*, the animal being thus at all times protected from insects or vermin, which are prevented from effecting a lodgment thereon.

In some cases, where our invention is applied to a new metallic collar, the shank *a* may be dispensed with, if desired, and the receptacle B be soldered or brazed to the outside of the collar over an aperture, *c*, therein, as seen in Fig. 3; but we generally prefer the construction first described.

Our improvement may be applied to a collar at a trifling cost, and the receptacles B may, if desired, be made exceedingly ornamental, thus adding to the beauty and finish of the article.

Although our invention is designed particularly for dog-collars, it is evident that it may be applied equally as well to collars for sheep, horses, and other animals, and by its use the inconvenience and annoyance of frequently rubbing powder or other insect or vermin exterminating substance over the animal, as heretofore, is entirely avoided.

What we claim as our invention, and desire to secure by Letters Patent, is—

1. A dog or animal collar having one or more chambers or receptacles adapted to contain an insect or vermin exterminating substance or compound, each receptacle being provided with an outlet or eduction passage to allow of the escape of the exterminating substance, substantially as described.

2. A dog or animal collar having one or more hollow receptacles, B, for containing an insect or vermin exterminating substance or compound, each receptacle being provided with an open tubular shank, *a*, which forms a conductor or outlet for the exterminating substance, substantially as set forth.

Witness our hands this 10th day of December, A. D. 1881.

JOHN W. RICKER.
TRISTRAM S. LEWIS.

In presence of—
P. E. TESCHEMACHER,
W. J. CAMBRIDGE.